Oct. 9, 1962     T. Y. KORSGREN, JR     3,057,223
LOCKING ACTUATOR ASSEMBLY FOR ELECTRICAL SWITCHES AND THE LIKE
Filed May 3, 1960
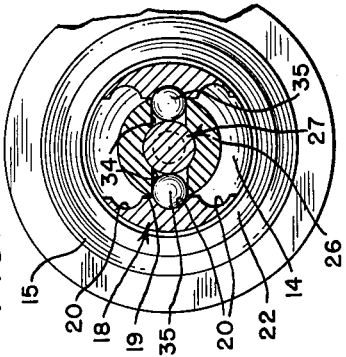
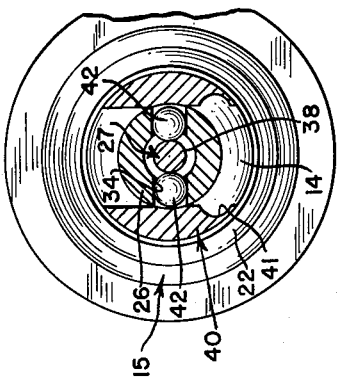
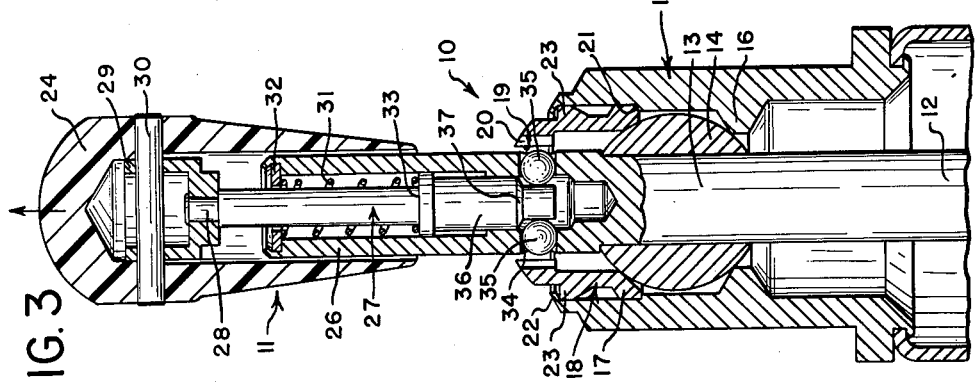
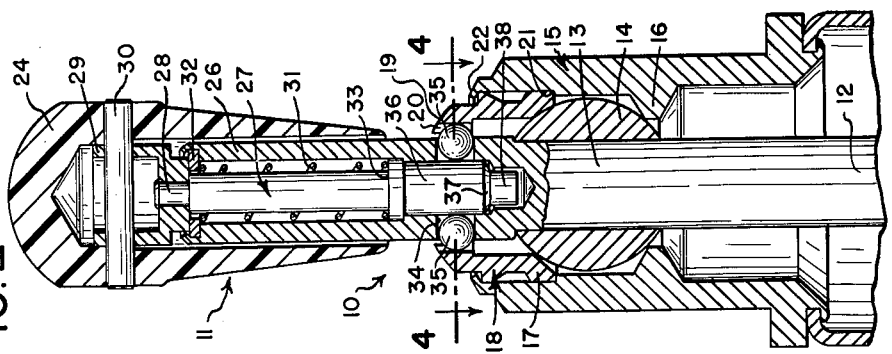
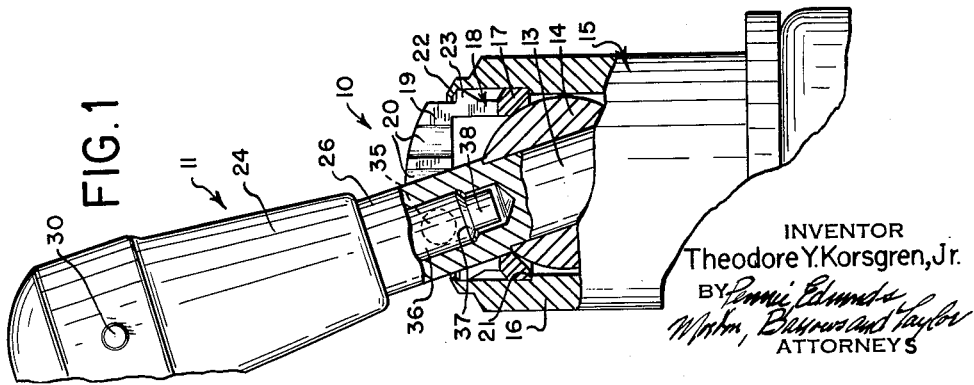
INVENTOR
Theodore Y. Korsgren, Jr.
BY
ATTORNEYS

United States Patent Office 3,057,223
Patented Oct. 9, 1962

3,057,223
LOCKING ACTUATOR ASSEMBLY FOR ELECTRICAL SWITCHES AND THE LIKE
Theodore Y. Korsgren, Jr., Woodbury, Conn., assignor to Haydon Switch, Inc., Waterbury, Conn., a corporation of Connecticut
Filed May 3, 1960, Ser. No. 26,540
7 Claims. (Cl. 74—491)

This invention relates generally to actuators and more specifically to an adjustable locking actuator.

The present invention concerns an improved locking actuator such as might be used in connection with the control of electrical switches or the like. In its broader aspects, the invention provides a ball-lock arrangement which is adapted to cooperate with an actuator lever to enable the lever to be locked in one of several positions. The lever accommodates one or more locking balls which are partially laterally shiftable into one of several recesses or grooves within the actuator housing. The locking balls are positively retained by the lever and actuator housing, and a resulting positive locking action between these members causes the lever to be locked relative to the housing.

A more specific aspect of the invention is to provide an actuator lever having a resiliently telescoping handle section to actuate the ball lock mechanism. The telescoping handle includes an outer gripping portion which is reciprocally movable relative to an inner cylindrical sleeve. The sleeve is attached rigidly to or forms an integral part of the actuating lever and appropriate bearing means permit the lever as a whole to be pivotally movable within the actuator housing. The inner sleeve portion is also provided with recesses in which two oppositely disposed steel locking balls may be fully accommodated. The locking balls may be thrust laterally outwardly from their fully recessed positions by a plunger slidably mounted within the sleeve, which is attached to the gripping portion of the handle and is reciprocally movable therewith. Immediately adjacent the recesses in the sleeve, the actuator housing forms a pattern of locking grooves so that when the locking balls are thrust laterally outwardly by the plunger, they will assume a position of partial nesting within the housing and within the recesses in the lever. This causes the lever to be locked in a given position relative to the housing. The plunger is resiliently biased to be in a normally locked position, and thus the lever will be automatically locked in a selected position when the handle is released by the user.

These and other aspects of the invention will become more readily apparent upon a reading of the following detailed description of a preferred embodiment and of the accompanying drawings in which:

FIG. 1 is a cross-sectional view of an actuator assembly constructed according to the invention, in which the actuating lever has been shown in a locked position;

FIG. 2 is a section taken at right angles to that of FIG. 1;

FIG. 3 is a section similar to that of FIG. 2 but showing the actuating lever in an unlocked position;

FIG. 4 is a section taken along the line 4—4 of FIG. 2; and

FIG. 5 is a view similar to FIG. 4 but showing a modified locking pattern according to the invention.

With reference now to the drawings, an actuator designated generally as reference numeral 10 includes a lever having an actuating end 12 and a bearing portion 13. The bearing portion 13 has been provided with a ball type bearing member 14 which is supported within an actuator housing 15 for uniplanar pivotal movement. Toward this end, the housing 15 forms a lower annular bearing portion 16 for the ball bearing member 14 while an upper annular bearing surface 17 is formed by a collar 18. The upper part of the collar 18 forms a channel 19 having a series of grooves or recesses 20 therein, the purpose of which will become presently clear. The channel 19 thus permits pivotal movement of the lever in a direction parallel to the channel 19 but restricts pivotal movement of the lever at right angles thereto.

The collar 18 is seated at its lower end adjacent the bearing surface 17 against an annular shoulder 21 formed within the housing 15. Collar 18 is pressed down against shoulder 21 by a deformable rim 22 which is rolled or crimped down upon an annular projection 23 of the collar 18. It will be understood that the collar 18 including the grooves or recesses 21 therein may thus be easily assembled within the housing 15.

As shown, a handle 11 is provided comprising a slidable handle grip 24 which has been formed as a generally cylindrical hollow sleeve. Immediately adjacent the grip 24 is an inner sleeve 26 which is rigidly affixed to or forms an integral part of the bearing portion 13 of the lever and its actuating end 12. Grip 24 and the sleeve 26 are relatively reciprocally movable for controlling lever movement relative to the housing 15. A plunger 27 is located internally adjacent to the sleeve 26 portion and is attached at its upper end to grip 24 for reciprocal movement relative to the sleeve 26. Plunger 27 has been provided with an upper neck 28 of reduced diameter attached to a hollow collar 29. Collar 29 and grip 24 are connected together by means of a pin 30. A compression spring 31 is situated in a cavity between the plunger 27 and sleeve 26. The spring 31 is held in compression between a washer 32 crimped to the upper end of sleeve 26 and a radial shoulder 33 formed in the plunger 27. Thus, the spring 31 will normally force the plunger 27 downwardly into the position shown in FIGS. 1 and 2.

Sleeve 26 has been provided with two oppositely disposed recesses 34 which may each fully accommodate one of two steel balls 35. As shown in FIG. 2, when the plunger 27 is in its downward position, the balls 35 are prevented from entirely entering the recesses 34 by the enlarged section 36 of the plunger 27. As illustrated in FIG. 4, the portions of balls 35 which protrude from the recesses 34 in the sleeve are received within two of the oppositely disposed recesses 20 provided in the channel 19. Consequently when the plunger 27 is in the position shown in FIGS. 1 and 2, the lever will be positively locked in position because of the dual retention of the balls 35 within the recesses 34 and within selected recesses 20 in the channel 19.

In FIG. 3, the lever has been shown in its unlocked position. In this position, the outer handle grip 24 has been pulled in order to draw plunger 27 upwardly therewith relative to the sleeve 26. The lower end of plunger 27 has been formed with an annular bevel 37 and a section of reduced diameter 38. When the upward movement of the plunger has brought the bevelled portion 37 and the reduced diameter portion 38 to the position shown, the pivotal movement of the lever will cause recesses 20 to act as camming surfaces to force the oppositely disposed steel balls 35 entirely within the recesses 34 in the sleeve. Thus, the lever as a whole may now be moved to any position within the limits imposed by the ends of the channel 19. Providing that the lever is adjacent to one of the three sets of grooves in the channel 19, the lever will automatically be locked in one of three positions by simply releasing the slidable handle grip 24. The plunger 27 will then automatically be thrust downwardly by spring 31 to force the balls 35 partially out of the recesses in the sleeve 26 and partially into a corresponding set of grooves 20. If the lever is not adjacent to a set of locking grooves, when the grip 24 and plunger 27 are released, the lever is movable to any position until the balls find a set of grooves to lock into.

It has been mentioned previously that the collar 18 is held within the housing 15 by a deformable rim 22 which is rolled or crimped down upon an outer edge portion 23 of the collar 18 in order to assemble the parts together. The selection of collars, such as 18, containing a given pattern of locking grooves is ordinarily made during the manufacture of the actuator assembly. It will be apparent that other collars having a different pattern of locking grooves may be substituted for the collar 18 of FIGS. 1–4. These may be made easily removable after the initial manufacture by providing some readily disconnectable means other than the deformable metal rim 22, as will be readily understood.

In FIG. 5, a collar 40 corresponding to collar 18 except for a different pattern of locking recesses, has been shown. The collar 40 has only one pair of oppositely disposed grooves 41, and hence only one position in which the lever may be locked. If the plunger 27 is released, when in the position shown, the locking balls 42 will remain beneath the plunger until the lever is moved adjacent to the grooves 41. The spring action of the plunger 29 will then force the balls 42 automatically into the grooves 41 to lock the lever in position.

Another area wherein a simple interchange of parts is facilitated is in the use of different handle grips for the actuating lever. In the event that grips of different shapes are required for touch indentification of levers controlling different functions, the grip 24 may be easily removed and replaced with another by the simple removal and replacement of the connecting pin 30, without in any way disturbing or altering the operation of the ball lock mechanism controlled by reciprocation of the separate grips. Both of the interchangeability features described permit the present actuator to be quickly adapted to the specific requirements of a given situation.

Since the above detailed description refers to a preferred embodiment only and is merely representative, in order to determine fully the spirit and scope of the invention, reference is made to the appended claims, in which I claim:

1. A pivoting actuator for an electrical switch or the like comprising a housing, a lever having actuating and control portions, a telescoping handle mounted concentrically with said control portion and reciprocally movable relative thereto, said control portion being supported within said housing for pivotal movement relative thereto, at least one locking ball carried by said lever within a radial recess therein, said housing defining at least one locking groove for engaging said ball, and a plunger received within said control portion and movable by said handle for laterally shifting said ball into engagement with said groove when said lever has been pivoted to bring said recess into substantial alignment with said groove.

2. A pivoting actuator according to claim 1 in which said pivoting actuator lever is guided for pivotal movement within a channel formed in said housing, said channel having at least one locking groove for engaging said locking ball when the latter has been partially laterally shifted from said radial recess.

3. A pivoting actuator according to claim 2 which includes a pair of oppositely disposed locking balls, said channel having a plurality of oppositely disposed locking grooves such that said pivoting actuator lever may be selectively locked in more than one position during the pivotal movement thereof.

4. A pivoting actuator according to claim 2 wherein that part of said housing which defines said channel comprises a collar separably mounted on the remaining portion of the housing such that said collar may be replaced by another separable collar having a different pattern of locking grooves therein.

5. A pivoting actuator according to claim 1 in which said control portion comprises a spherical bearing and said housing defines a spherical socket for supporting said bearing.

6. A pivoting actuator according to claim 1 in which said control portion includes a cylindrical hollow sleeve and said radial recess communicates between the exterior and hollow interior of said sleeve.

7. A pivoting actuator for an electrical switch or the like comprising a housing, a lever having actuating and control portions, a telescoping handle mounted concentrically with said control portion and reciprocally movable relative thereto, said control portion being supported within said housing for pivotal movement relative thereto, said handle being reciprocally movable relative to said control portion, said control portion including a hollow sleeve portion having at least one radial recess therein communicating between the exterior and the interior thereof, said plunger being located within said sleeve portion and being attached to said handle for reciprocal movement therewith relative to said control portion, a locking ball received within said recess and adapted to be substantially fully accommodated therein when said plunger is raised a predetermined distance by said handle, said housing defining at least one locking groove for engaging said ball, said ball being thrust in a radial direction partially from said recess and into said locking groove upon a downward movement of said plunger when said lever is pivoted to bring said recess into substantial alignment with said groove, such that said ball will be engaged partially by said groove and partially by said lever to lock said pivoting actuator lever in a selected position.

References Cited in the file of this patent

UNITED STATES PATENTS

| | | |
|---|---|---|
| 1,472,242 | Covi | Oct. 30, 1923 |
| 1,487,380 | Harris | Mar. 18, 1924 |
| 1,983,063 | Baits | Dec. 4, 1934 |
| 2,106,870 | Floss | Feb. 1, 1938 |
| 2,144,616 | Carlson | Jan. 24, 1939 |
| 2,270,932 | Cronelius | Jan. 27, 1942 |
| 2,403,162 | Zancan | July 2, 1946 |
| 2,517,075 | Aquila | Aug. 1, 1950 |
| 2,553,991 | Wagner et al. | May 22, 1951 |
| 2,885,893 | Lane et al. | May 12, 1959 |
| 2,885,905 | Larkin | May 12, 1959 |
| 2,901,804 | Williams | Sept. 1, 1959 |

FOREIGN PATENTS

| | | |
|---|---|---|
| 569,050 | France | Jan. 3, 1924 |
| 377,532 | Great Britain | July 28, 1932 |
| 405,108 | Great Britain | Feb. 1, 1934 |
| 467,183 | Italy | Nov. 28, 1951 |